(12) United States Patent
Corder et al.

(10) Patent No.: US 6,672,638 B2
(45) Date of Patent: Jan. 6, 2004

(54) AUTOMOTIVE VEHICLE OPEN AIR SYSTEM

(75) Inventors: George A. Corder, Romulus, MI (US); James E. Tousignant, New Boston, MI (US); Bernard W. Schaller, Flat Rock, MI (US); Christopher H. Purcell, Southgate, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/272,589

(22) Filed: Oct. 16, 2002

(65) Prior Publication Data

US 2003/0047954 A1 Mar. 13, 2003

Related U.S. Application Data

(63) Continuation of application No. 09/730,916, filed on Dec. 6, 2000, now Pat. No. 6,485,094.

(51) Int. Cl.⁷ .................................................. B60R 7/00
(52) U.S. Cl. ............... 296/24.1; 296/37.16; 296/216.02
(58) Field of Search ............................ 296/24.1, 190.1, 296/190.11, 220.01, 65.09, 65.16, 65.17, 146.16, 37.16, 146.4, 146.8, 85, 216.02

(56) References Cited

U.S. PATENT DOCUMENTS

| | | | |
|---|---|---|---|
| 2,122,712 A | * | 7/1938 | Bishop .................. 296/220.01 |
| 2,632,668 A | | 3/1953 | Keller |
| 3,211,492 A | | 10/1965 | Wozena et al. |
| 3,699,716 A | | 10/1972 | Wanlass |
| 4,063,774 A | | 12/1977 | Hanks |
| 4,272,121 A | | 6/1981 | Kim |
| 4,543,747 A | | 10/1985 | Kaltz et al. |
| 4,609,222 A | | 9/1986 | Boots |
| 4,630,858 A | | 12/1986 | Bez |
| 4,801,174 A | | 1/1989 | Hirshberg et al. |
| 4,842,326 A | | 6/1989 | DiVito |
| 4,932,717 A | | 6/1990 | Swann |
| 5,029,937 A | | 7/1991 | Yamamoto |
| 5,378,036 A | | 1/1995 | Townsend |
| 5,746,475 A | | 5/1998 | Caye et al. |
| 5,795,016 A | | 8/1998 | Otake |
| 5,921,611 A | | 7/1999 | Townsend |
| 5,934,727 A | | 8/1999 | Storc et al. |
| 5,961,177 A | | 10/1999 | Caye et al. |

(List continued on next page.)

FOREIGN PATENT DOCUMENTS

| | | |
|---|---|---|
| DE | 199 13 033 A1 | 10/2000 |
| JP | 405278468 | 10/1993 |

OTHER PUBLICATIONS

Autoweek, The Car, "1964 Studebaker Wagonaire", by Kit Foster, p. 29, Jul. 2, 2001.

"Honda's Spocket Concept," Autoweek, Oct. 25, 1999, p. 4.

Artistic sketches of tail lamp invented by another prior to Oct. 11, 1999.

Artistic sketch of Sedan trunk/pickup storage bed invented by another prior to Oct. 11, 1999.

Translation of selected passages of German Patent Application DE 199 13 033 A1.

*Primary Examiner*—Dennis H. Pedder
(74) *Attorney, Agent, or Firm*—Harness, Dickey & Pierce, P.L.C.

(57) ABSTRACT

An automotive vehicle open air system includes a pair of vehicle side frames, one or more movement mechanisms, a back window assembly and an automatic actuator. In another aspect of the present invention, an automotive vehicle includes a front header panel, first and second vehicle side frames, first and second tracks, a sunroof panel, a back window panel and an electrical system operable to coordinate movement of the sunroof panel and the back window panel.

21 Claims, 22 Drawing Sheets

U.S. PATENT DOCUMENTS

| | | |
|---|---|---|
| 6,073,995 A | 6/2000 | Klein |
| 6,129,413 A | 10/2000 | Klein |
| 6,217,096 B1 * | 4/2001 | Koiwa et al. ............... 296/24.1 |
| 6,260,905 B1 | 7/2001 | Wagner |
| 6,260,916 B1 | 7/2001 | Hunt |
| 6,273,487 B1 | 8/2001 | Schurig et al. |
| 6,279,989 B1 * | 8/2001 | Marchart et al. ........... 296/197 |
| 6,305,740 B1 | 10/2001 | Staser et al. |
| 6,312,041 B1 * | 11/2001 | Queveau et al. ....... 296/107.17 |
| 6,318,782 B1 * | 11/2001 | Suzuki et al. .............. 296/37.1 |
| 6,457,771 B2 * | 10/2002 | Farber ................... 296/220.01 |
| 6,478,355 B1 | 11/2002 | Van Eden et al. |
| 6,481,772 B1 * | 11/2002 | Tenn ....................... 296/26.11 |
| 6,485,094 B2 | 11/2002 | Corder et al. |

\* cited by examiner

AUTOMOTIVE VEHICLE OPEN AIR SYSTEM

CROSS REFERENCE TO RELATED APPLICATIONS

This application is a continuation of U.S. Ser. No. 09/730,916 filed Dec. 6, 2000 now U.S. Pat. No. 6,485,094.

BACKGROUND AND SUMMARY OF THE INVENTION

The present invention relates generally to automotive vehicles and more particularly to an automotive vehicle open air system.

It is known in the automotive industry to provide vehicles having movable sunroof panels and pop-top venting panels within otherwise stationary roofs. For example, U.S. Pat. No. 5,746,475 entitled "Drive Mechanism for an Automotive Vehicle Sunroof Assembly" which issued to Caye et al. on May 5, 1998, discloses a sunroof assembly while U.S. Pat. No. 6,073,995 entitled "Powered Venting Panel Assembly" which issued to Klein on Jun. 13, 2000, discloses a venting pop-top sunroof; both of these patents are incorporated by reference herein. U.S. Pat. No. 4,801,174 entitled "Transparent Roof Convertible Automobile" which issued to Hirshberg et al. on Jan. 31, 1989, shows another automotive vehicle sunroof system.

Various attempts have also been made to allow vertical and rear accessibility to a storage compartment in an otherwise enclosed vehicle. For example reference should be made to U.S. Pat. No. 4,932,717 entitled "Pickup Truck Bed Cap" which issued to Swann on Jun. 12, 1990 and U.S. Pat. No. 4,272,121 entitled "Station Wagon with Adjustable Rear Roof Panel" which issued to Kim on Jun. 9, 1981. These traditional constructions, however, are relatively crude and aesthetically unacceptable for high volume production of luxury-type passenger vehicles.

In accordance with the present invention, an automotive vehicle open air system includes a pair of vehicle side frames, one or more movement mechanisms, a back window assembly and an automatic actuator. In another aspect of the present invention, an automotive vehicle includes a front header panel, first and second vehicle side frames, first and second tracks, a sunroof panel, a back window panel and an electrical system operable to coordinate movement of the sunroof panel and the back window panel. A further aspect of the present invention provides a cable driven linkage for tilting open a sunroof panel. Still another aspect of the present invention employs a first panel, movable from a closed position to an open position, which generally spans between a pair of vehicle side rails, and a second panel which is movable in a generally vertical direction from a retracted position to an advanced position. The present invention additionally includes a vehicular tail panel, movable from a raised position to a lowered position, and an aesthetically pleasing close-out panel, movable from a first position to a second position in response to movement of the tail panel.

The automotive vehicle open air system of the present invention is advantageous over conventional devices in that an aesthetically pleasing, refined, quick to operate and automatic open air system is provided which allows for conversion of a passenger vehicle into a pickup truck-like vehicle. This advantageously allows for vertical and rear storage access to a storage compartment. Thus, large objects are capable of being stowed on the bed which otherwise would exceed the enclosed space in the storage area. In other words, a box can be stored in the storage compartment which is vertically higher than a normal plane of the closed roof and back window. The present invention is further advantageous over conventional constructions by providing very compact packaging of the opened back window and sunroof. The structural integrity of the vehicle is also optimized due to the presence of the vehicle side rails while the open air environment is maximized through the sunroof and back window arrangement. Additional advantages and features of the present invention will become apparent from the following description and appended claims, taken in conjunction with the accompanying drawings.

DETAILED DESCRIPTION OF THE PREFERRED EMBODIMENT

Figure 1:
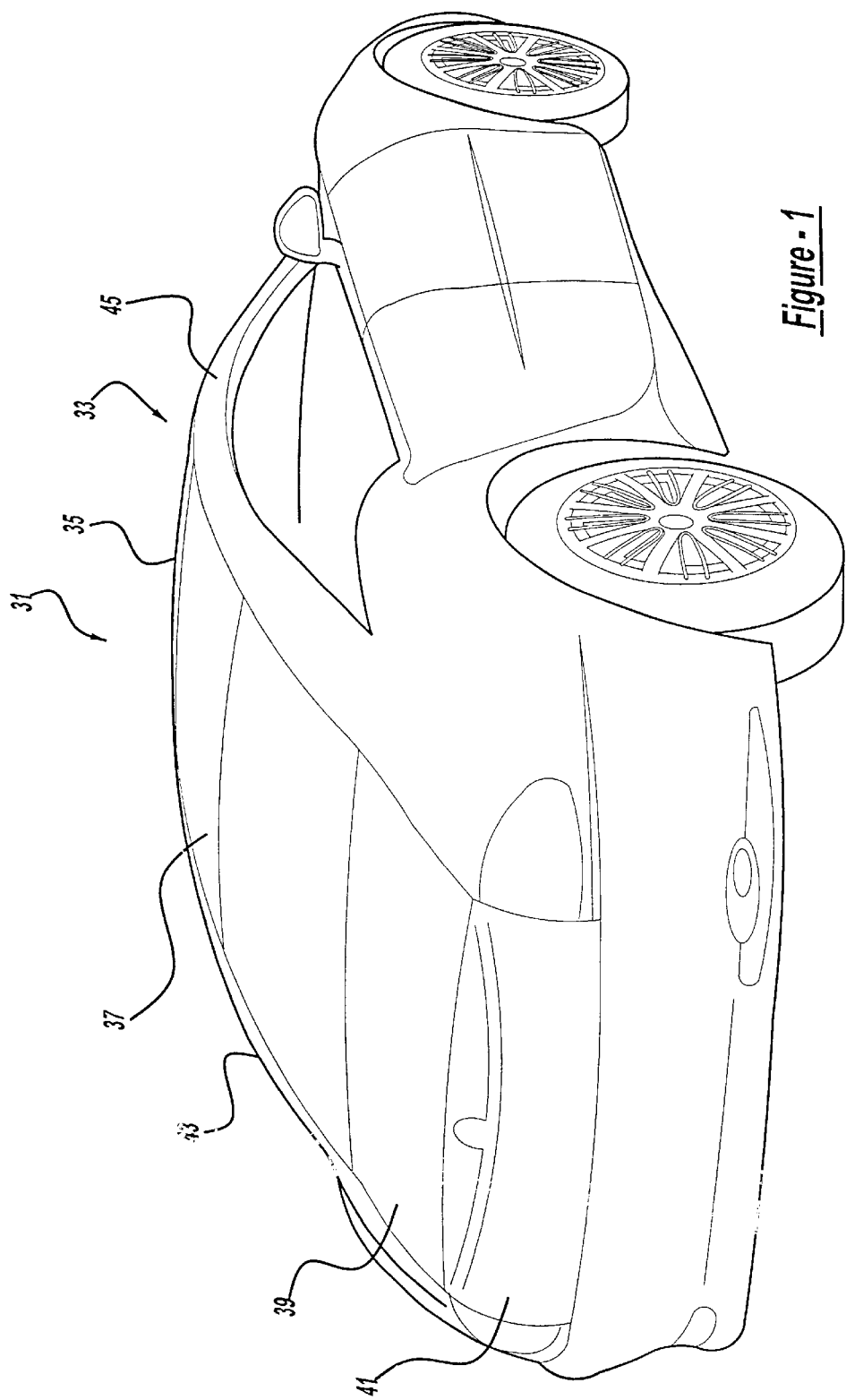
FIG. 1 is a rear perspective view showing the preferred embodiment of an automotive vehicle open air system of the present invention, with a front sunroof assembly, rear sunroof assembly, back window assembly and tail panel assembly all disposed in their respective closed positions.

Referring to FIGS. 1–6, an automotive vehicle 31 has the preferred embodiment of an open air system 33 of the present invention which includes a front venting or pop-top sunroof assembly 35, a second sunroof assembly 37, a back window or backlite assembly 39, and a tail panel assembly 41. Sunroof assemblies 35 and 37, as well as back window assembly 39 and tail panel assembly 41, all span in a cross-car manner generally between a pair of structural vehicle side rails 43 and 45. Side rails 43 and 45 are connected together by a structural front header panel 47 (see FIG. 6) which is located immediately above a front windshield 49.

Figure 2:
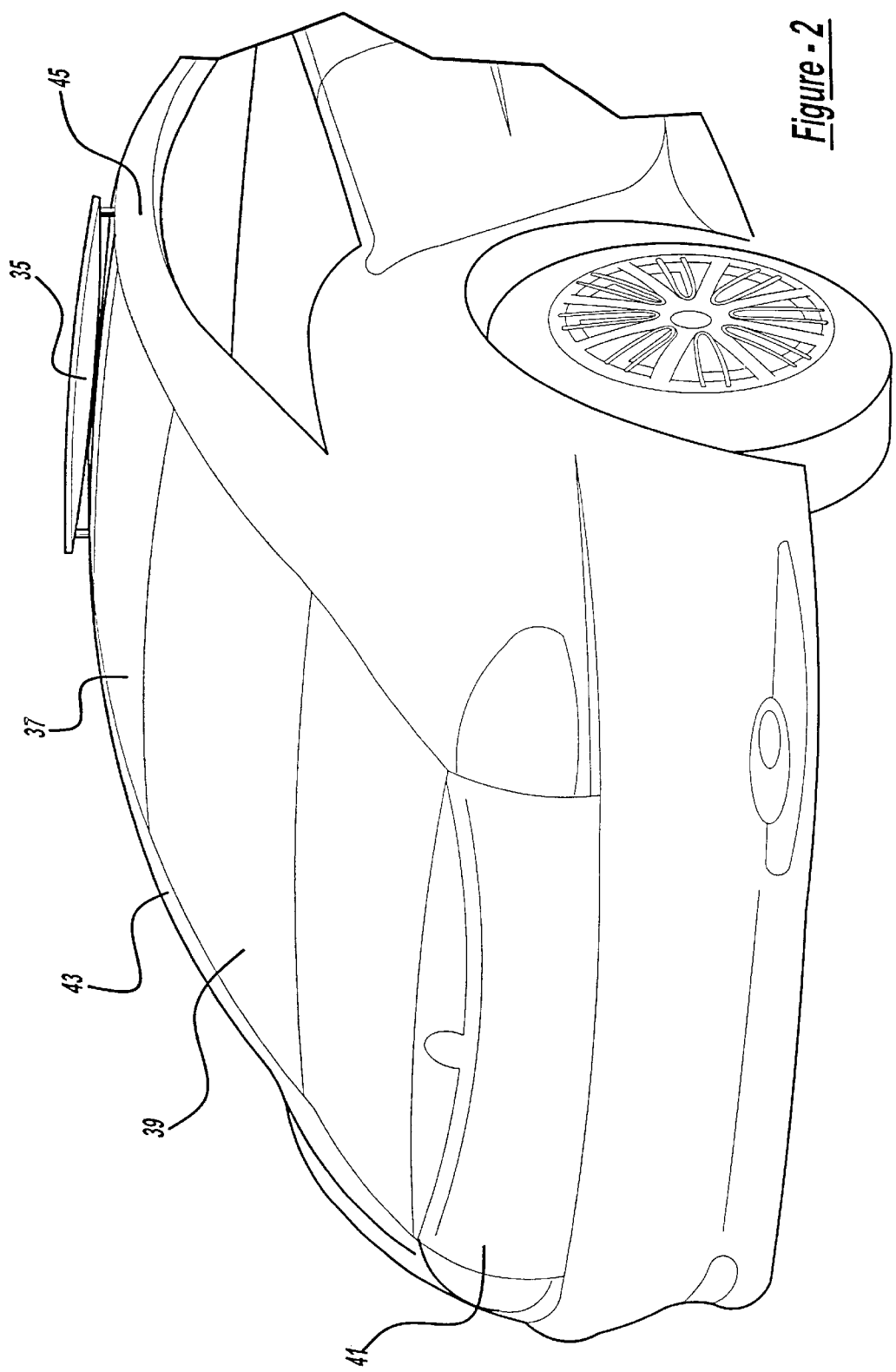
FIG. 2 is a fragmentary perspective view, like that of FIG. 1, showing the preferred embodiment system, but with the front sunroof assembly disposed in an open position.

Front sunroof assembly is movable from a closed position (see FIG. 1) to an open and upwardly tilted position (see FIG. 2). Furthermore, second sunroof assembly 37 is slidable from a closed position (see FIGS. 1 and 2) to a rearward open position (see FIG. 3) which is rearward of the front and at least a majority of the rear seating areas of the passenger compartment. Additionally, back window assembly 39 is movable from a closed position (see FIGS. 1–3) to an open position (see FIG. 4) which is raised and forward of the closed position. Simultaneously with the movement of back window assembly 39, tail panel assembly 41 is retracted from a closed position (see FIGS. 1–3) to a lowered and open position (see FIG. 4) thereby allowing storage access to a floor 51 of a storage compartment in the vehicle. Thus, vehicle 31 can be automatically converted from a four door (or alternately two door coupe) luxury passenger car to a pickup truck-type of vehicle. It is noteworthy that in the presently preferred embodiment, side rails 43 and 45 are stationarily fixed to the vehicle thereby improving structural stiffness to the body side frame.

FIGS. 6–9 show front sunroof assembly 35 in greater detail. Front sunroof assembly 35 includes a front glass sunroof panel 61 mounted onto a metal frame 63 by an adhesive or the like. A linkage mechanism 65 is operably driven by an elongated and generally flexible Bowden cable 67 which, in turn, is operably driven by an electromagnetic actuator such as an electric motor 69. Electric motor 69 is a fractional horsepower, direct current electric motor which has a gear box engagably pushing and pulling cable 67 within a protective sheath or tube 71 extending therefrom. Linkage mechanism 65 has a first offset link 73 with a first end coupled to cable 67 by way of a pivot 75. An opposite second end of first offset link 73 is coupled to a second link 77 by way of a second pivot 79. Second link 77 is also rotatably coupled to a bracket 81, mounted on the underside of front sunroof frame 63, by way of a third pivot 83. A third fulcrum link 85 rotatably couples an intermediate and middle segment of first offset link 73 to a stationary bracket 87 secured to side rail 43, by way of pivots 89 and 91. Thus, when electric motor 69 is energized to pull cable 67, linkage mechanism 65 serves to upwardly tilt sunroof panel 61 to an open position about a front mounted hinge 93, secured to front header panel 47. The closed operation is opposite that previously described. Electric motor 69 is operably controlled by a micro processor 95 and a vehicle occupant accessible open/close switch 97.

Electric motor 69 and the underside of front header panel 47 are aesthetically covered by interior trim panels such as a headliner 99 (see FIG. 5) which includes an overhead center console and lighting system 101, and garnish moldings 103 and 105, which can be made of a polymeric material or other known fabric covered substrates. An elastomeric weather-strip 107 is also provided on a metal flange surrounding a front sunroof opening 109. Front sunroof panel 61 has a generally semi-circular top view shape with a predominantly straight rear edge.

FIGS. 10–13 and 17 best illustrate second sunroof assembly 37. Second sunroof assembly 37 includes an extruded aluminum track 131, elongated in a predominantly fore-and-aft direction, a movement mechanism 133 movably coupled to each track 131, a second glass sunroof panel 135, a sunroof panel frame 137 and an electric motor actuator 139 (see FIG. 22). A front coupling 141 of movement mechanism 133 employs a right angled bracket 143 mounted to an underside of frame 137. A cam following pin 145 inwardly projects from a downturned leg of bracket 143 and slides within an undercut camming channel 147 of track 131. Track 131 has an enlarged forward end 149 which contains an upwardly angled segment 151 and a level segment of channel 147. Thus, when pin 145 is advanced along upwardly angled segment 151 of track 131, bracket 143 causes second sunroof panel 135 to move in a vertical and forward direction, and vice versa.

Figure 3:
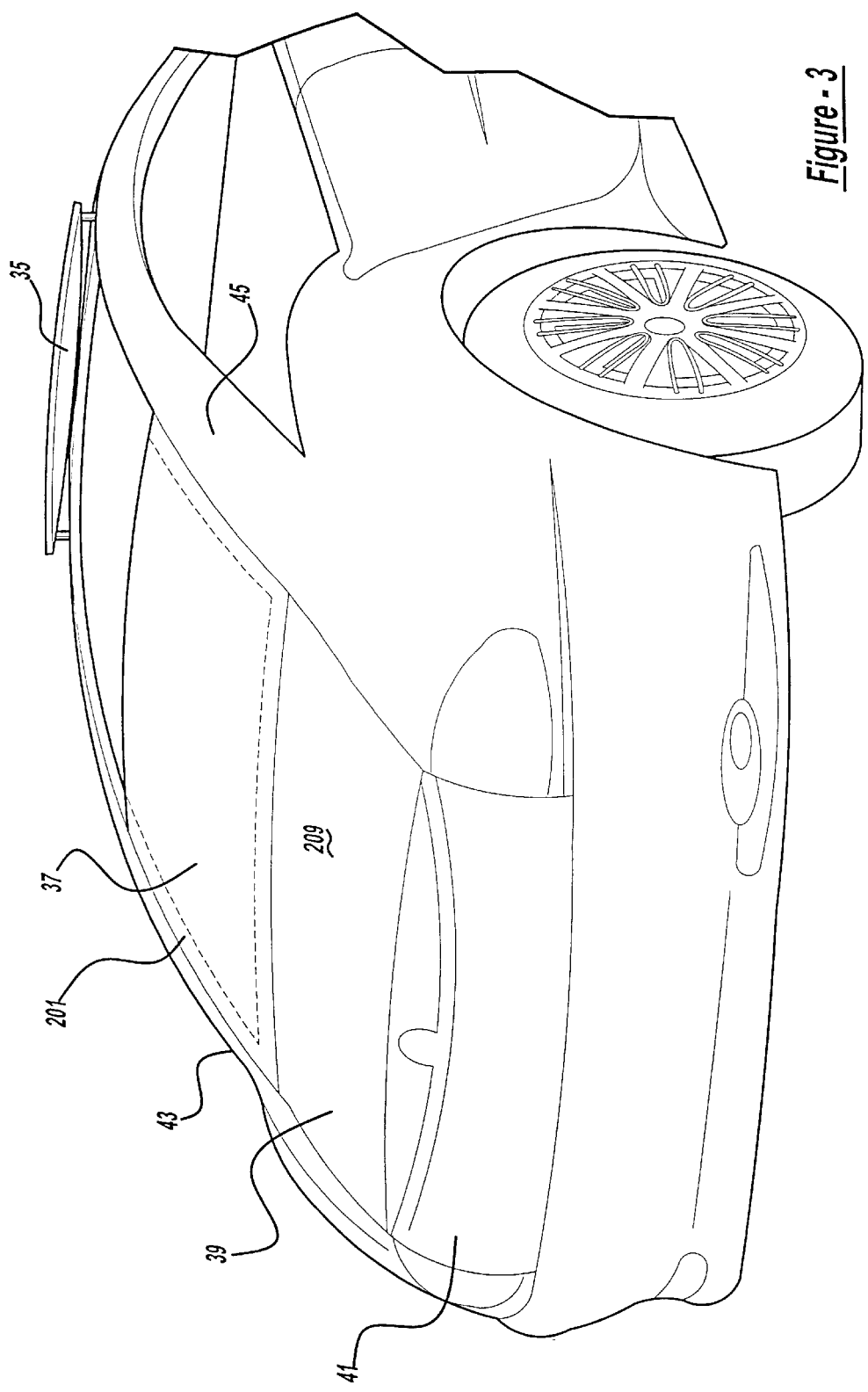
FIG. 3 is a fragmentary perspective view, like that of FIG. 1, showing the preferred embodiment system, but with the front and rear sunroof assemblies disposed in their respective open positions.
Figure 10:
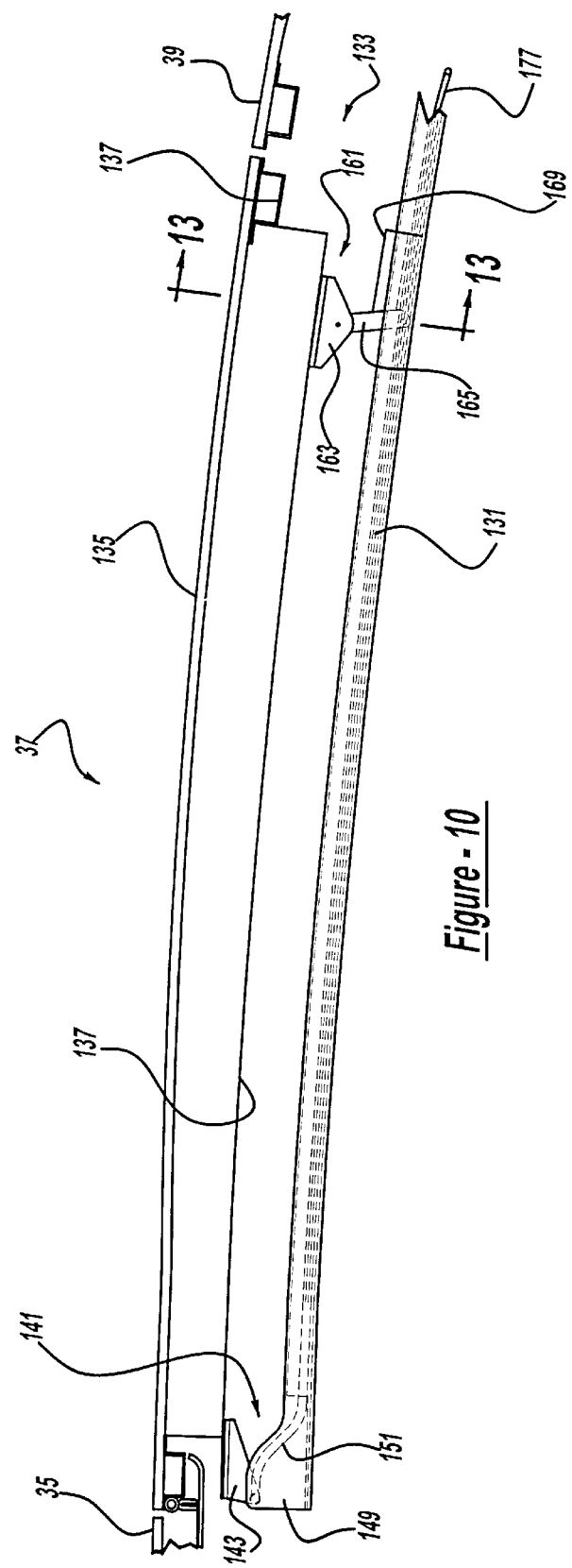
FIG. 10 is a diagrammatic side view showing the rear sunroof assembly of the preferred embodiment system, disposed in its closed position.

A rear coupling 161 of movement mechanism 133 movably controls the orientation of the adjacent rear section of second sunroof panel 135 relative to track 131. Rear coupling 161 has a right angled metal bracket 163 secured to an underside of frame 137. Rear coupling 161 further has a straight link 165 rotatably coupled to a downturned leg of bracket 163 by a pivot pin 167. A bottom section of link 165 is rotatably coupled between a pair of polymeric shoes 169 by a pivot pin 171. A supplemental outer shoe 173 is fastened to innermost shoe 169 in order to trap an upstanding segment 175 of track therebetween. An elongated and generally flexible Bowden cable 177 extends within a partially circular channel of track 131 and is attached to shoe 169 by way of an end fitting. Cable 177 extends within a sheath or tube 181 (see FIG. 4) between the rear end of track 131 and the corresponding gear box of the electric motor. Thus, when the electric motor is energized by micro processor 95 (see FIG. 22) and an occupant accessible second sunroof switch 183 (also see FIG. 22), then cable 177 is pushed forward within track 131; this causes shoes 169 to simultaneously advance forward. Advancing movement of shoes 169 serves to push the entire second sunroof assembly 37 forward relative to the stationary tracks 131. When cam following pin 145 reaches the upwardly angled segment 151 of track 131, the front section of sunroof panel 135 will be raised while causing a coincidental rotation of link 165 to a generally vertical orientation between bracket 163 and shoes 169. Hence, second sunroof assembly 37 is moved from a open or partially open position below the closed back window assembly 39 (as shown in FIGS. 3 and 11), to a closed position flush with a nominal roof plane 191 (as shown in FIGS. 1, 2 and 10) which is also immediately adjacent to and between front sunroof assembly 35 and back window assembly 39 when both are closed.

A flexible water drain tube 193 (see FIG. 6) extends from a forward end of track 131 and down an A-pillar thereby expelling water runoff from the second sunroof assembly. Furthermore, a weather-strip 195 is mounted on an upturned flange of a stationary cross-car metal beam or panel 197 (see FIGS. 6 and 11) which assists in gathering and channeling the water runoff toward the tracks 131.

With reference to FIGS. 14–17, back window assembly 39 includes a predominantly transparent glass back window 201 on top of a pair of supports 203 of the movement mechanisms. A downturned leg of each metal support 203 is secured to an undercut channel 205 of track 131 with the assistance of an outer shoe 207. An intermediate frame 204 is located between back window 201 and adjacent support 203 and is joined to an aesthetically pleasing exterior metal or polymeric deck panel 209 (see FIGS. 3, 4 and 14). An interior trim panel covers the interior surface of deck panel 209 and the exposed portions of the back window frame. An elongated and generally flexible Bowden cable 211 extends within a channel of each track 131 and is secured to shoe 207 by way of an end fitting 213. A back window electric motor 215 (see FIG. 22) engagably pushes and pulls cable 211, via a gear box, which acts to advance and retract back window assembly 39 relative to track 131 and the vehicle, responsive to micro processor 95 (see FIG. 22) and switch 183 (also see FIG. 22). The electric motors for the back window assembly and second sunroof assembly are deenergized when corresponding Hall effect sensors, potentiometer or limit switch sensors 241 and 243 (see FIG. 22) sense that an open or closed end, or other predetermined position has been reached.

Figure 4:
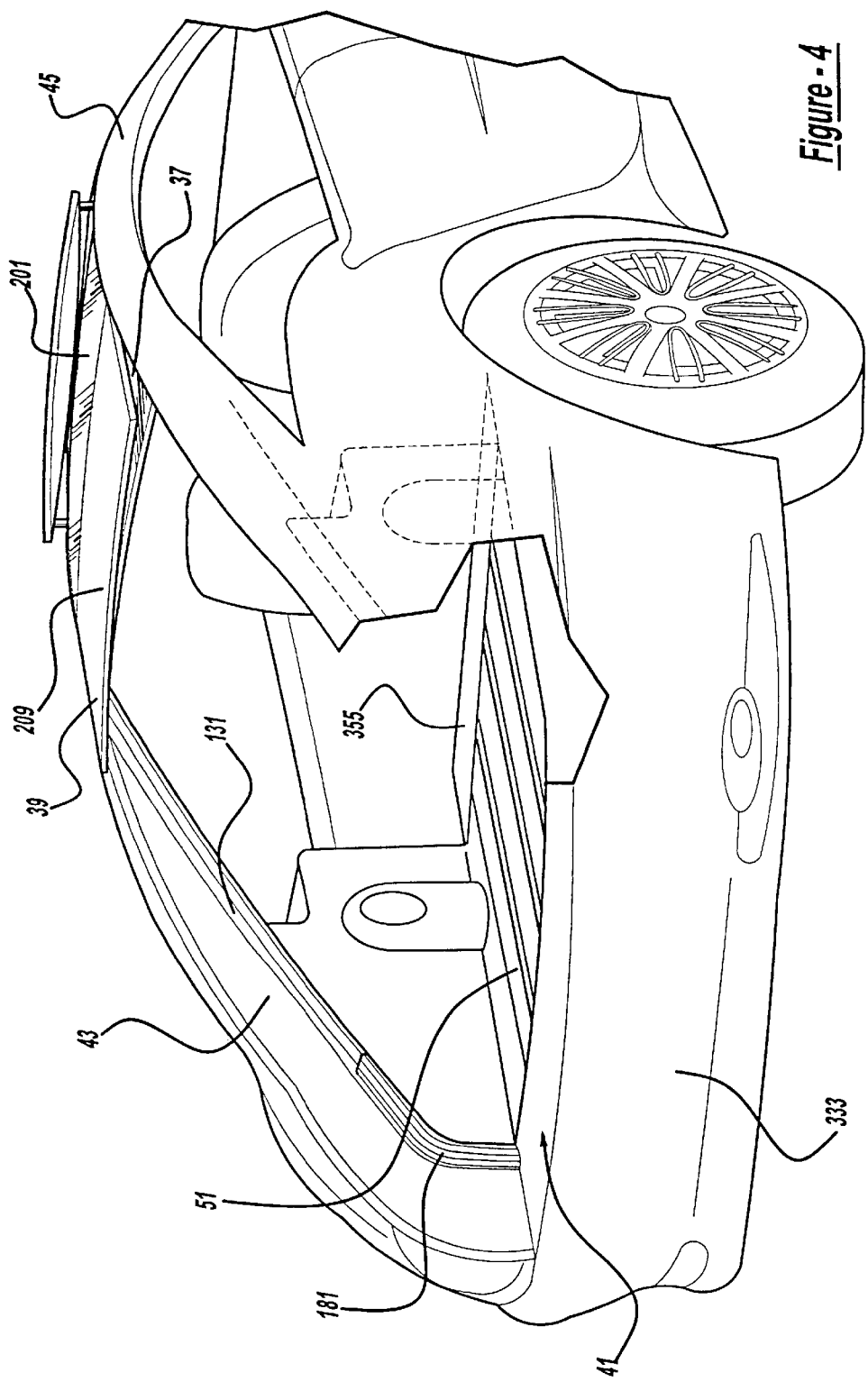
FIG. 4 is a fragmentary perspective view, like that of FIG. 1, showing the preferred embodiment system, but with the front sunroof assembly disposed in its open position and the back window assembly disposed in its open position.
Figure 5:
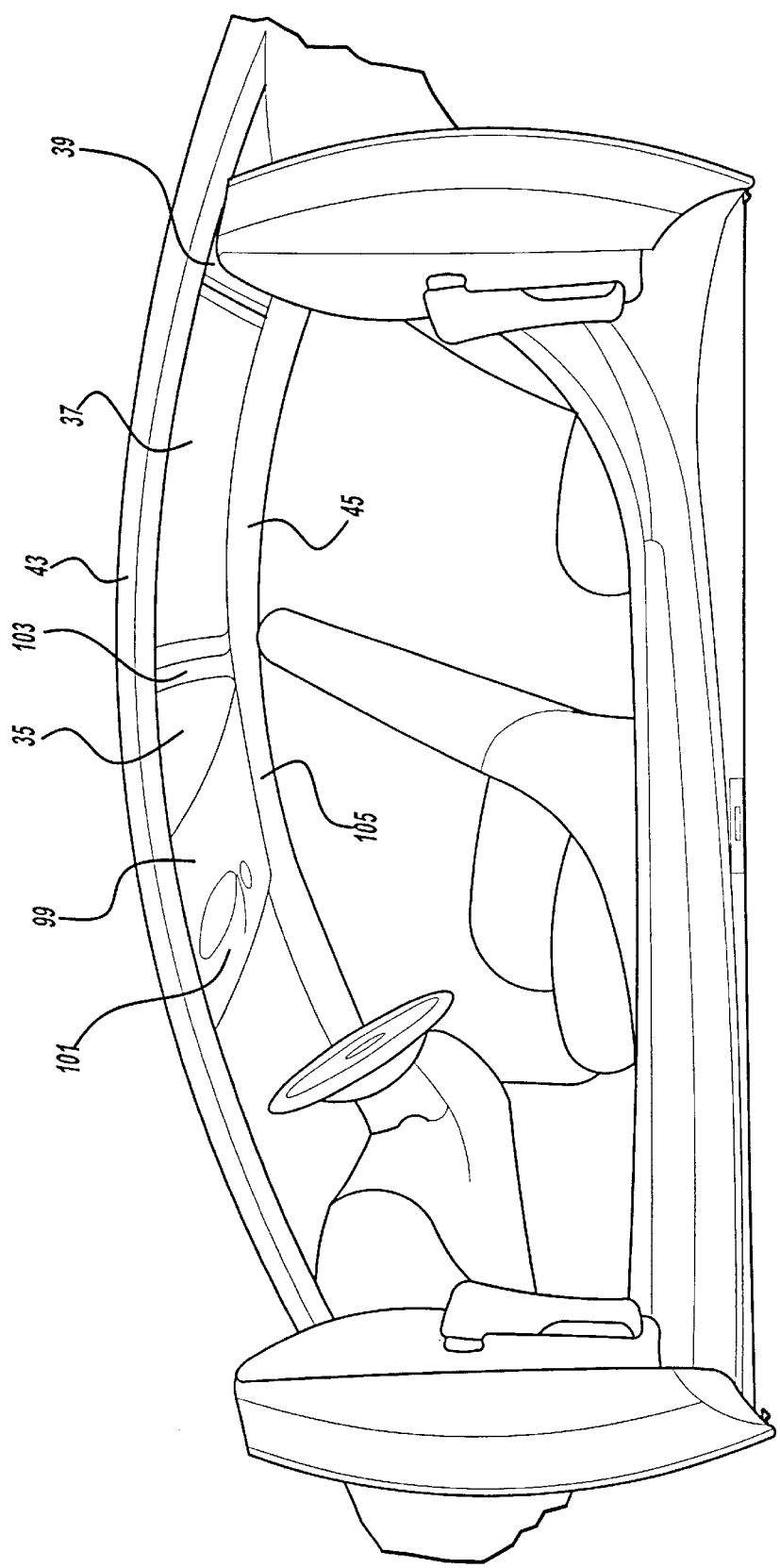
FIG. 5 is a side and fragmentary, perspective view showing the preferred embodiment system with the sunroof assemblies and back window assembly disposed in their respective closed positions.
Figure 6:
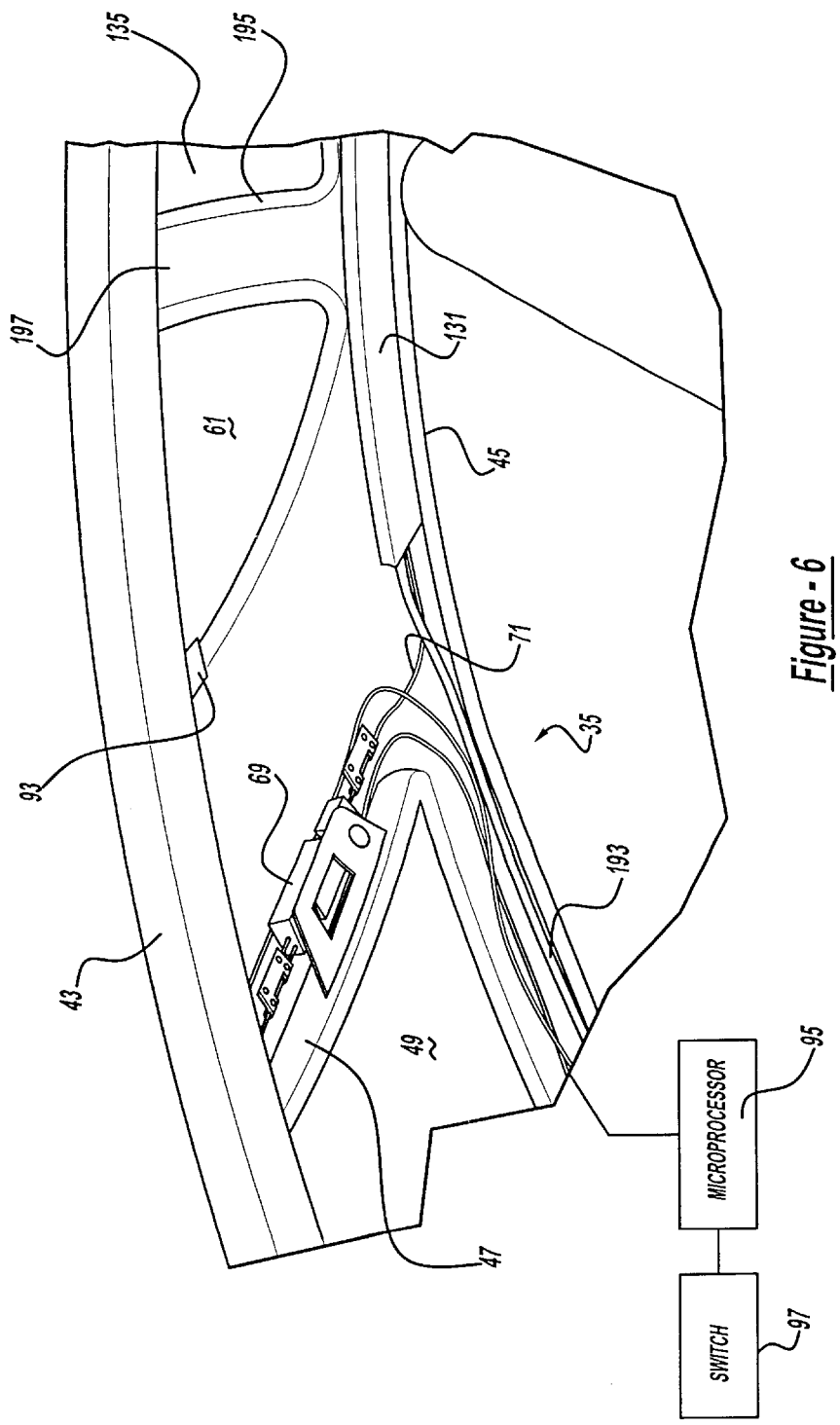
FIG. 6 is an enlarged and fragmentary, perspective view, like that of FIG. 5, showing the preferred embodiment system, but with an interior trim panel removed.
Figure 7:
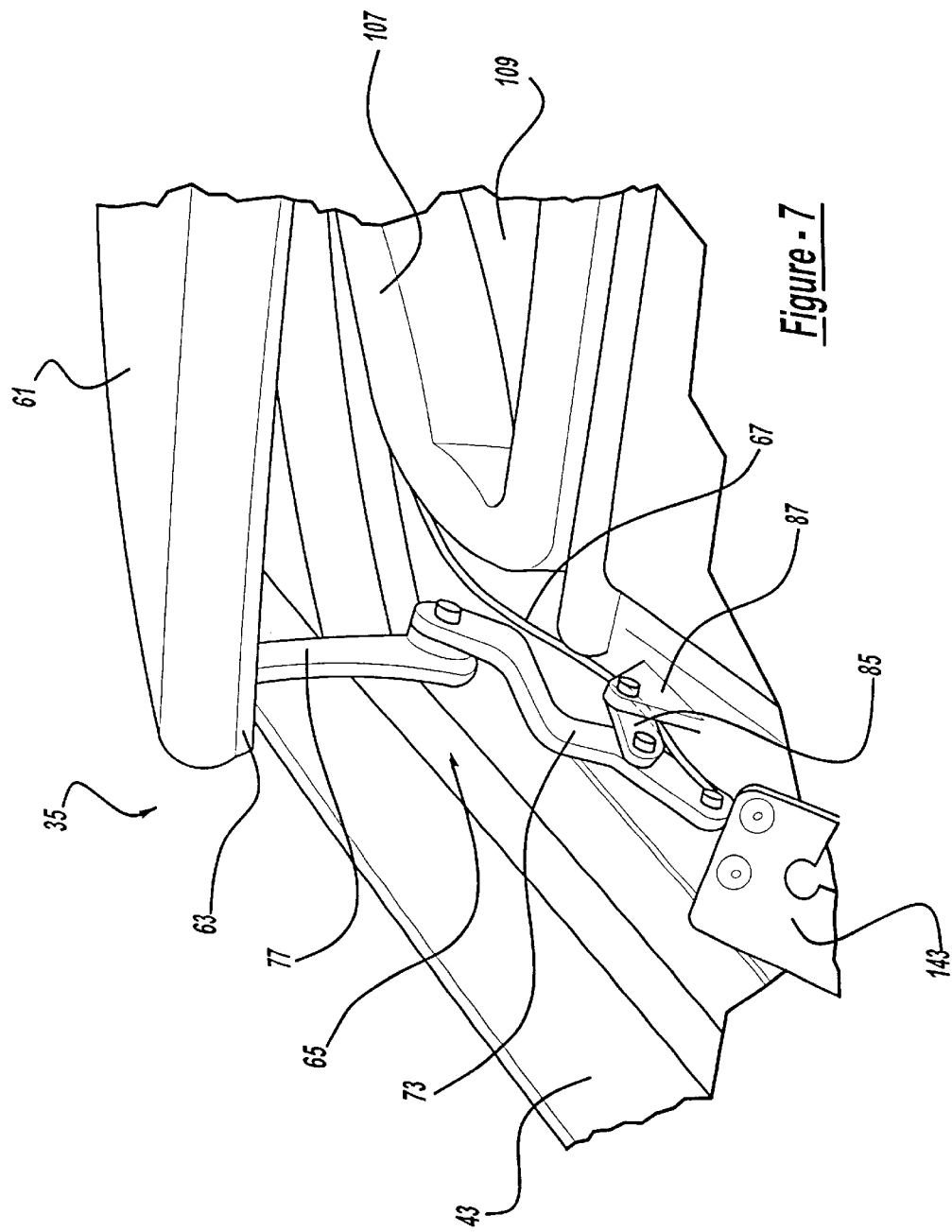
FIG. 7 is a top and fragmentary, perspective view showing the front sunroof assembly employed in the preferred embodiment system.
Figure 8:
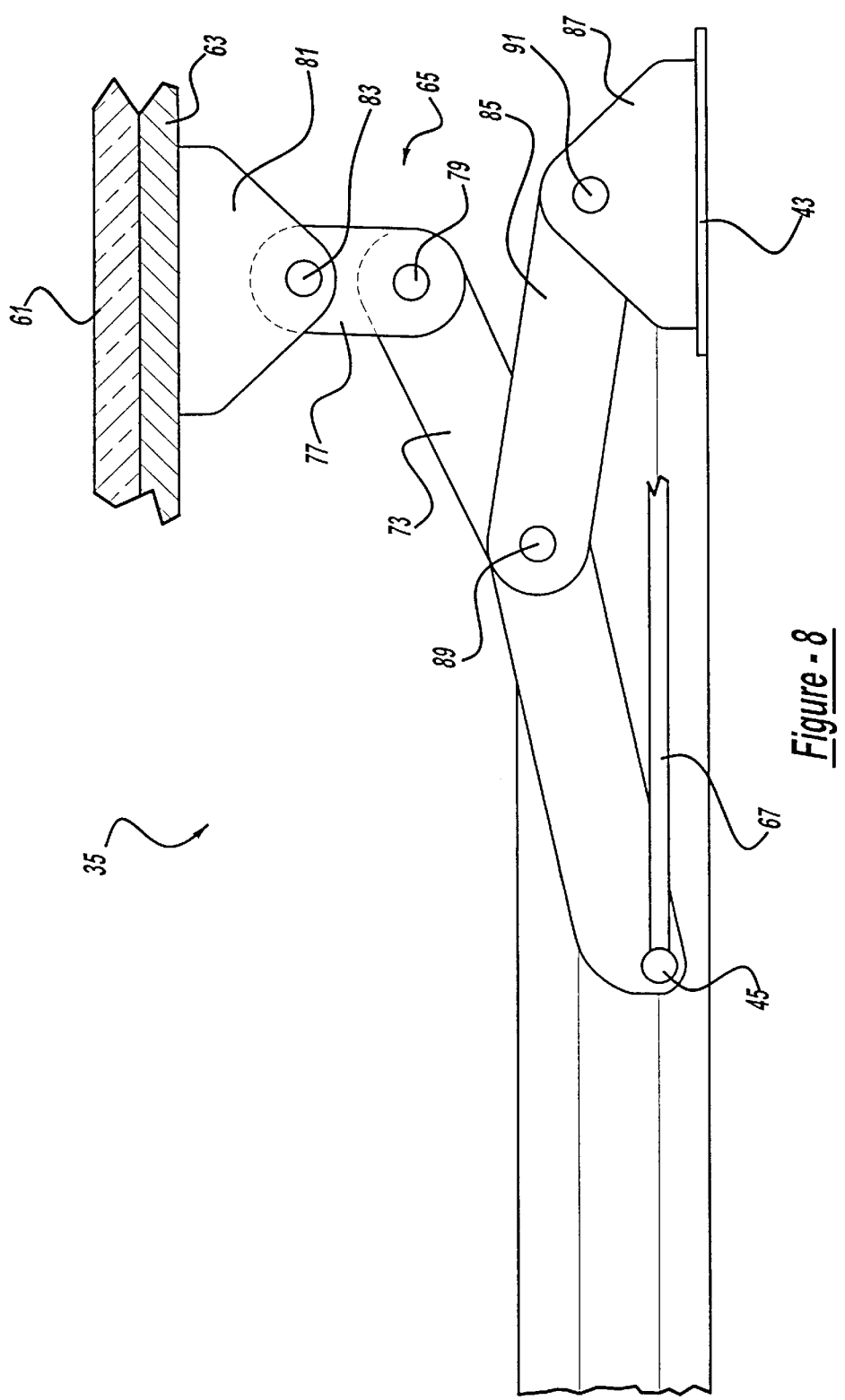
FIG. 8 is a diagrammatic side view showing a front sunroof mechanism employed in the preferred embodiment system, disposed in its closed position.
Figure 9:
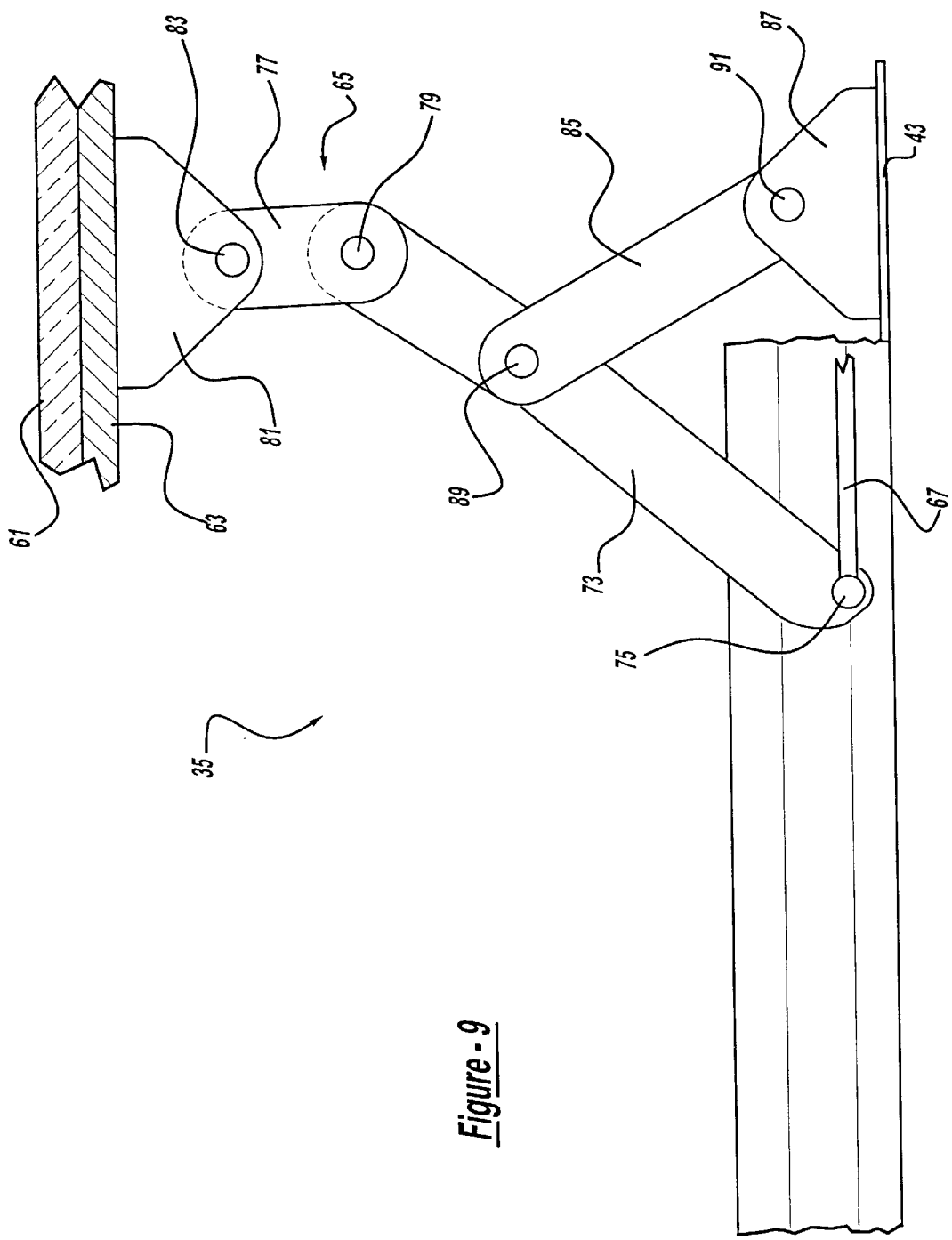
FIG. 9 is a diagrammatic side view showing the front sunroof mechanism employed in the preferred embodiment system, disposed in its open position.
Figure 11:
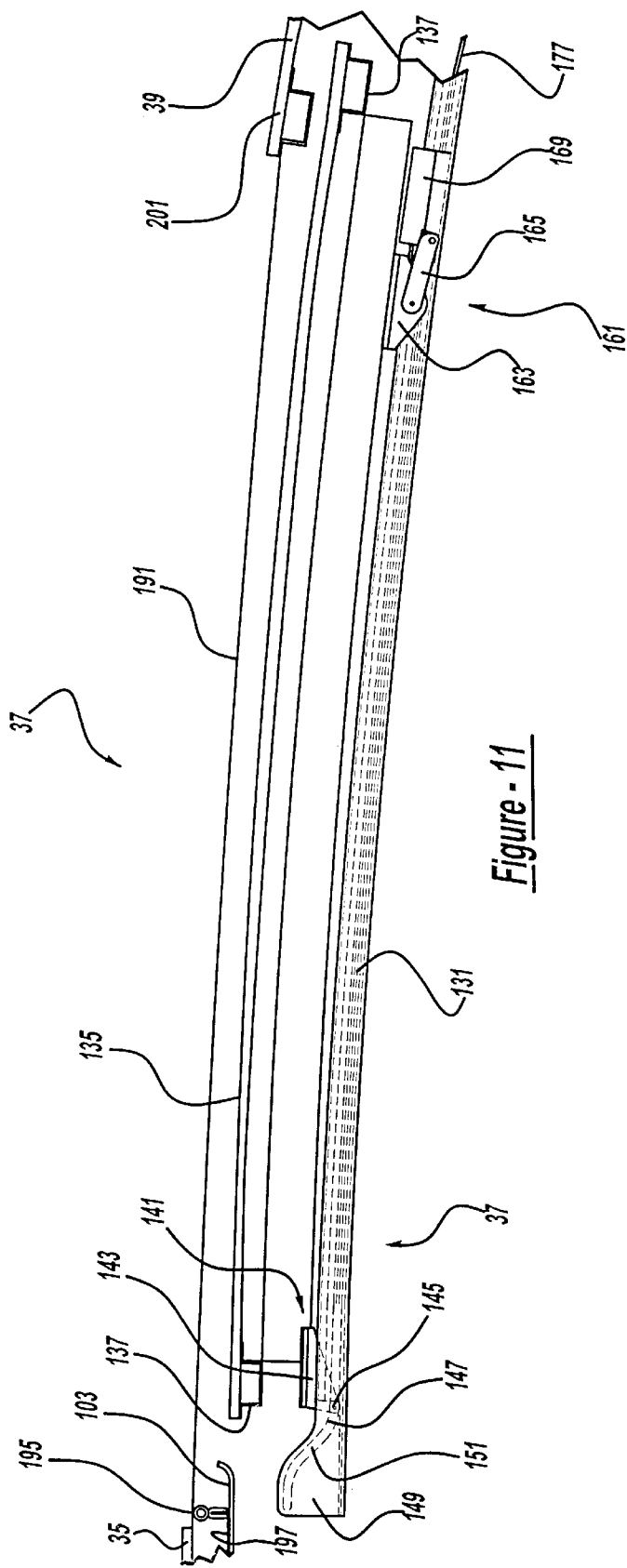
FIG. 11 is a diagrammatic side view showing the rear sunroof assembly of the preferred embodiment system, disposed in its partially opened position.
Figure 12:
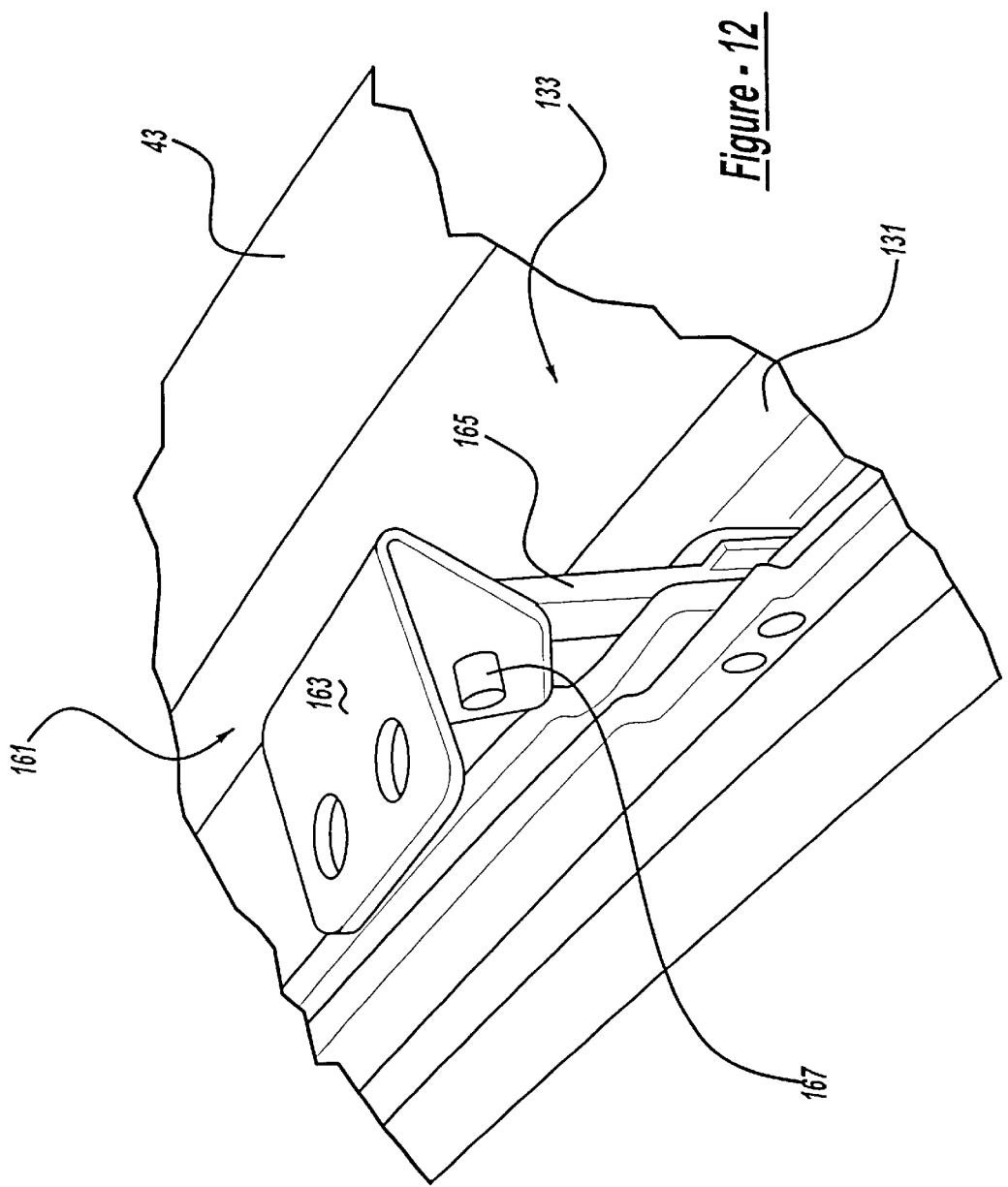
FIG. 12 is a fragmentary top perspective view showing a mechanism employed in the rear sunroof assembly of the preferred embodiment system.
Figure 13:
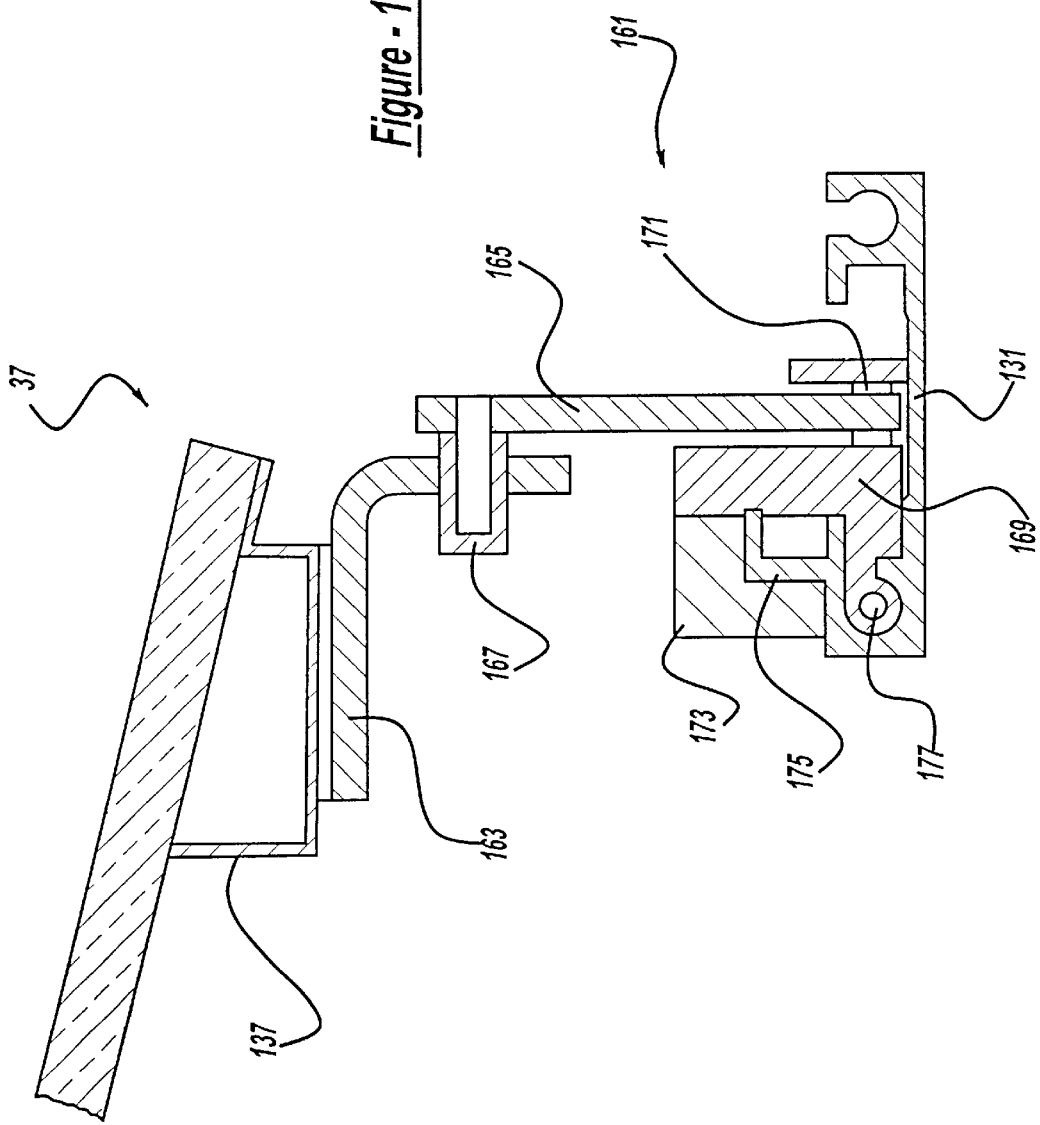
FIG. 13 is a cross sectional view, taken along line 13—13 of FIG. 10, showing the mechanism employed with the rear sunroof assembly of the preferred embodiment system.
Figure 14:
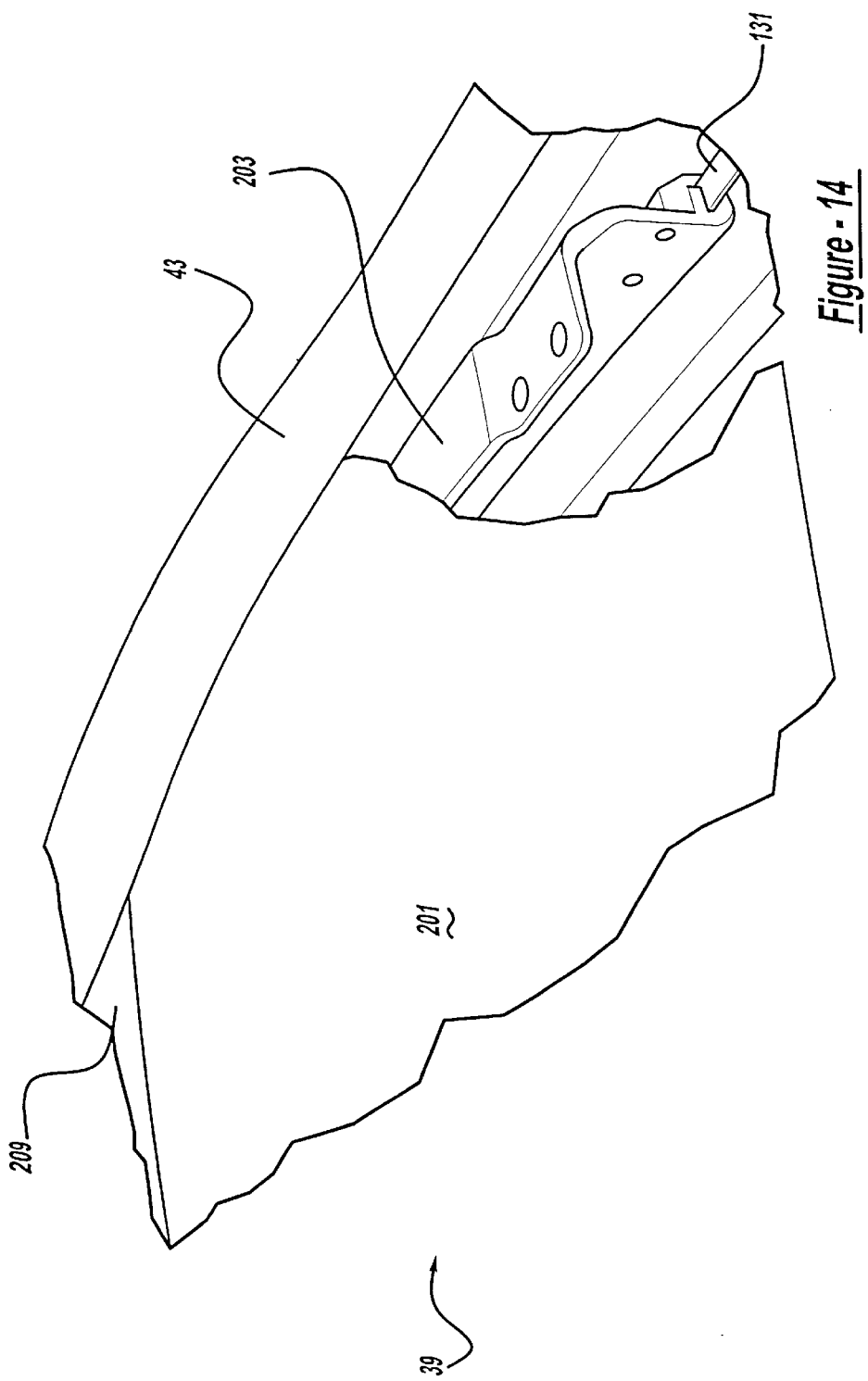
FIG. 14 is a top and partially fragmented perspective view showing a mechanism employed with the back window assembly of the preferred embodiment system.
Figure 15:
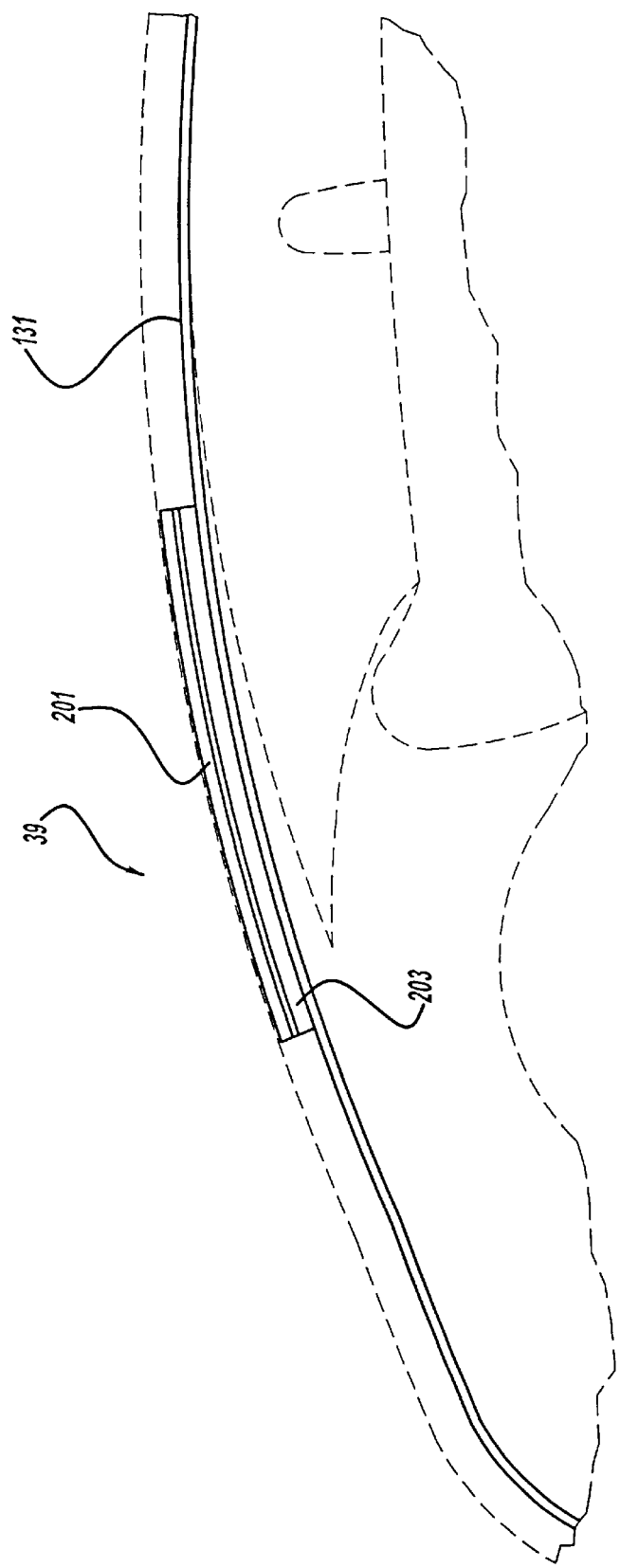
FIG. 15 is a diagrammatic side view showing the back window mechanism of the preferred embodiment system, disposed in its closed position.
Figure 16:
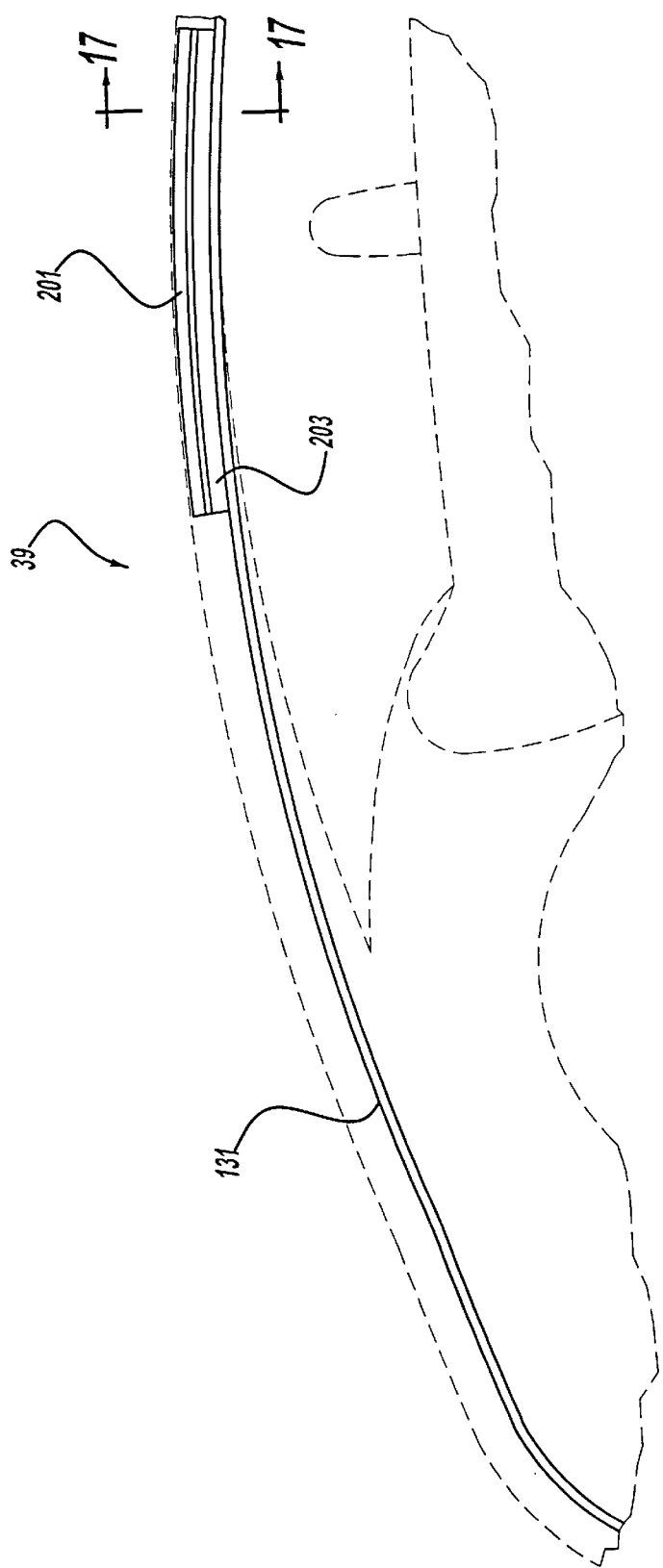
FIG. 16 is a diagrammatic side view showing the back window mechanism of the preferred embodiment system, disposed in its open position.
Figure 17:
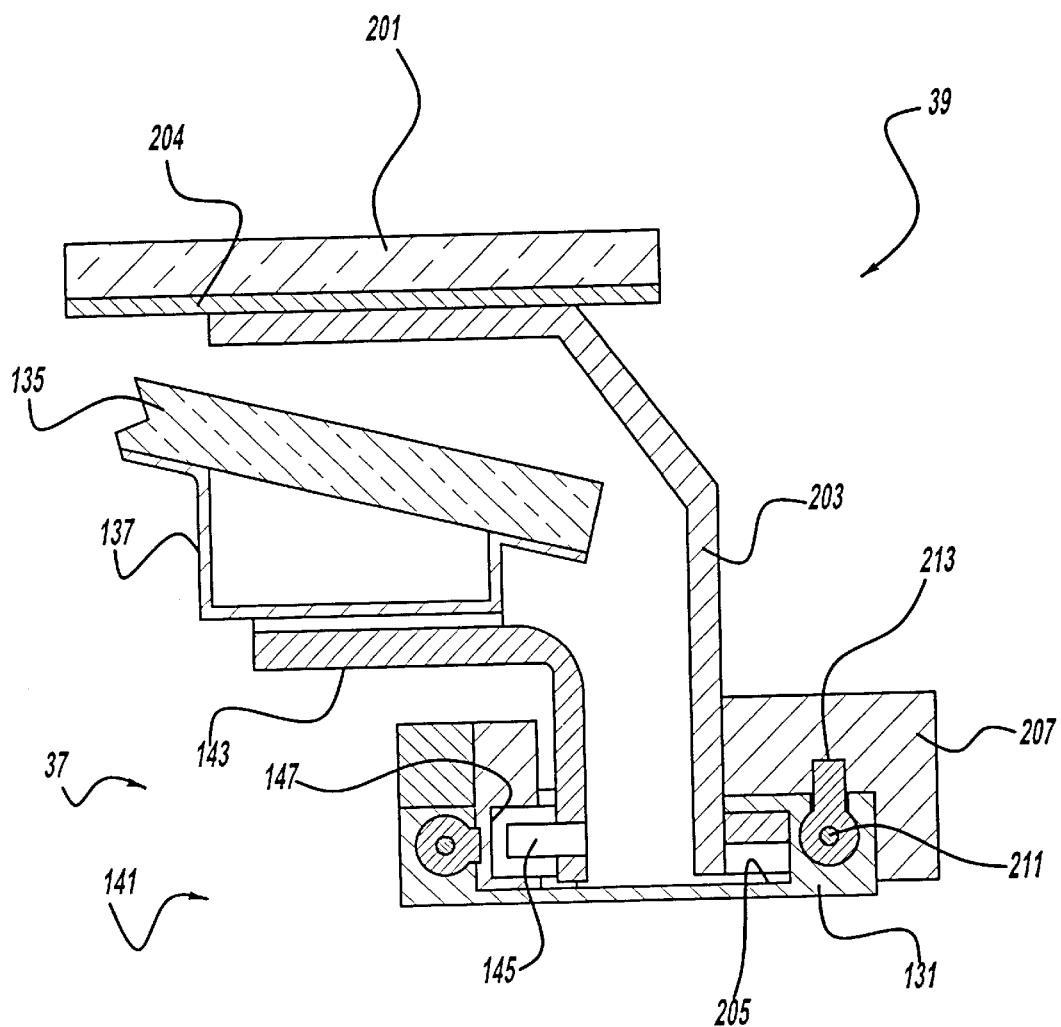
FIG. 17 is a cross sectional view, taken along line 17—17 of FIG. 16, showing the back window mechanism of the preferred embodiment system.

When it is desired to raise back window assembly 39 from its closed position (as shown in FIGS. 2 and 15) to its open position (as shown in FIGS. 4, 16 and 17), micro processor 95 (see FIG. 22) energizes the second sunroof motors to cause second sunroof assembly 37 to be moved to an intermediate lowered position as shown in FIGS. 11 and 17. Simultaneously, micro processor 95 causes the back window motors to push their corresponding cables, and thereby slide back window assembly 39, to the raised position above the intermediately disposed second sunroof panel 135 (as is shown in FIGS. 4, 16 and 17).

Figure 18:
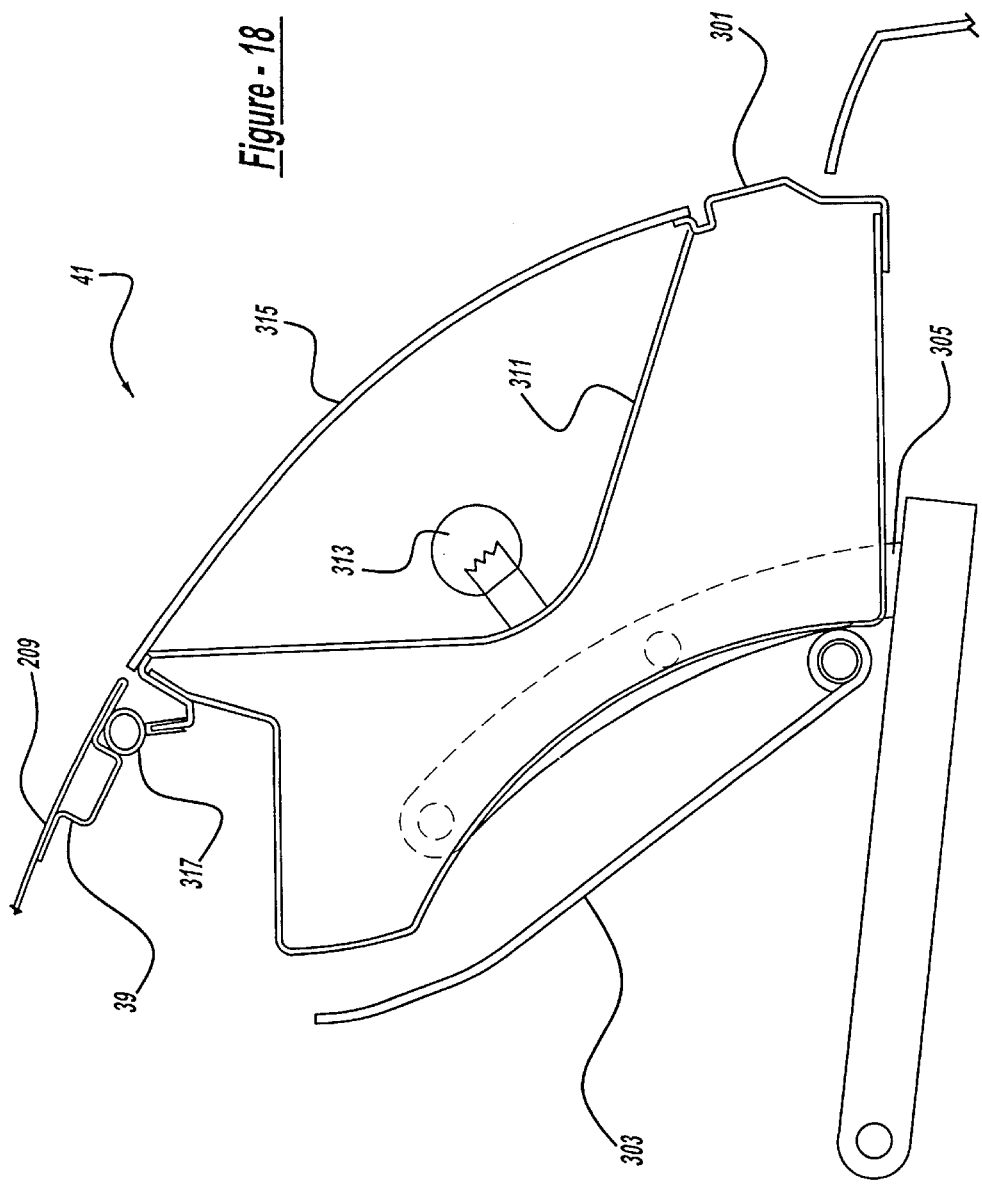
FIG. 18 is a diagrammatic side view showing the tail panel assembly of the preferred embodiment system, disposed in its closed position.
Figure 19:
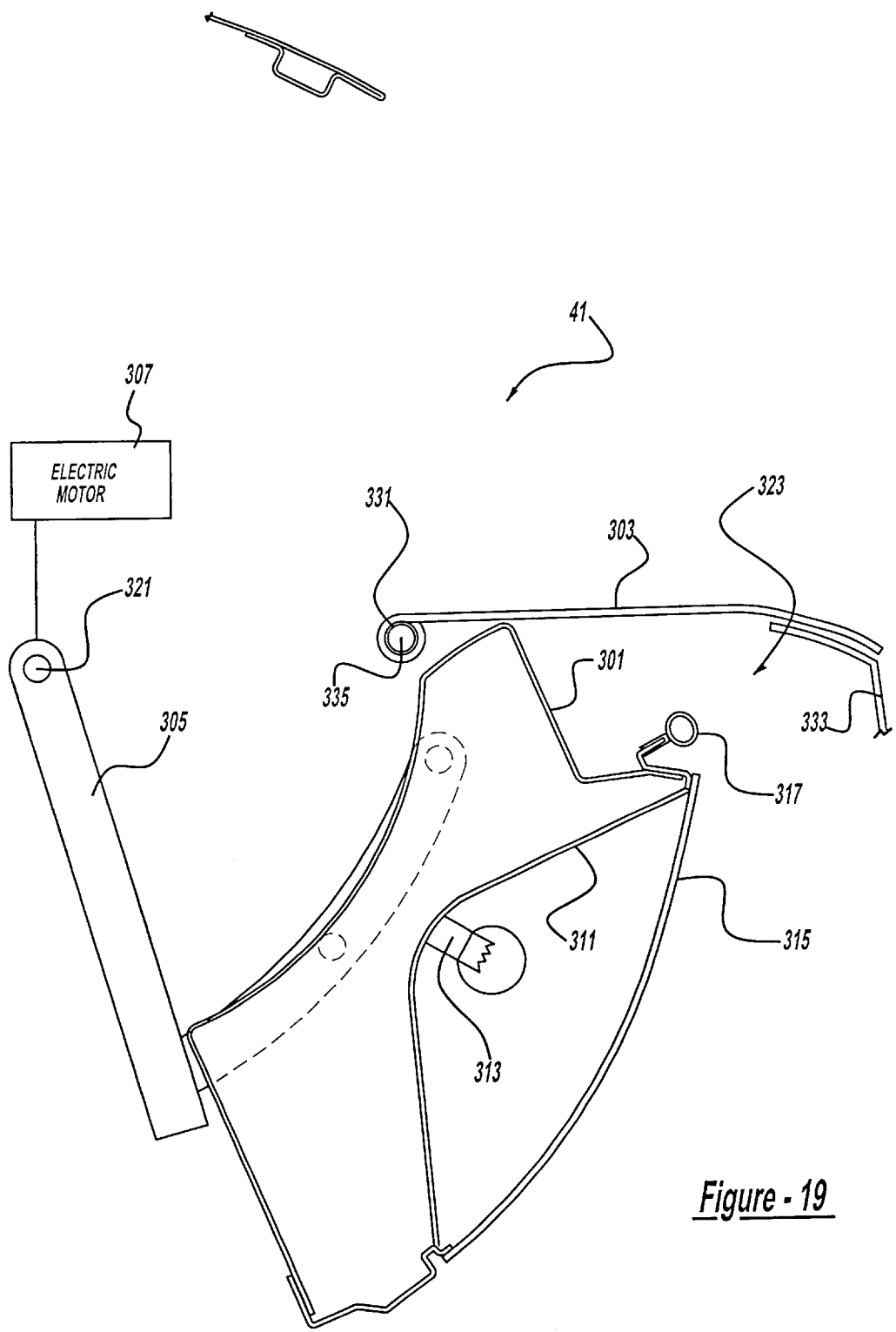
FIG. 19 is a diagrammatic side view showing the tail panel assembly of the preferred embodiment system, disposed in its open position.

Referring to FIGS. 1, 4, 18 and 19, rear tail panel assembly 41 includes a tail panel 301, a closeout panel 303, a retracting mechanism 305 and an automatic actuator or electric motor 307. Tail panel 301 has a set of sheet metal or polymeric panels joined together which retain a tail lamp reflector 311, incandescent light bulb 313, lens 315 and tail panel-to-back window assembly weather-strip 317. Tail panel 301 and closeout panel 303 are elongated in a generally cross-car direction at the rear of the vehicle. Retracting mechanism 305 has a set of metal arms fastened to each outboard end of tail panel 301. Each retracting mechanism 305 rotates about a pivot 321 attached to the adjacent inner quarter panel structure of the vehicle. Electric motor 307 located in the retracted tail panel storage space 323 operably drives retracting mechanism 305 through a push-pull type of cable, and is energized in response to control of the micro processor. Tail panel 301 is automatically retracted into the storage space 323 when back window assembly 39 is opened, and vice versa. Closeout panel 303 is compression or injection molded from a polymeric material and can be optionally covered with fabric or vinyl. Closeout panel 303 is spring biased by way of a torsion spring 331 toward a downwardly pivoted position against an upper surface of a vehicle facia 333. Closeout panel 303 is rotated about a stationary pivot pin 335. Upward rotation of tail panel 301 will contact against and coincidentally upwardly push closeout panel 303 to a somewhat vertically raised position, as shown in FIG. 18. This allows closeout panel 303 to also aesthetically hide and cover the forward side of tail panel 301.

Figure 20:
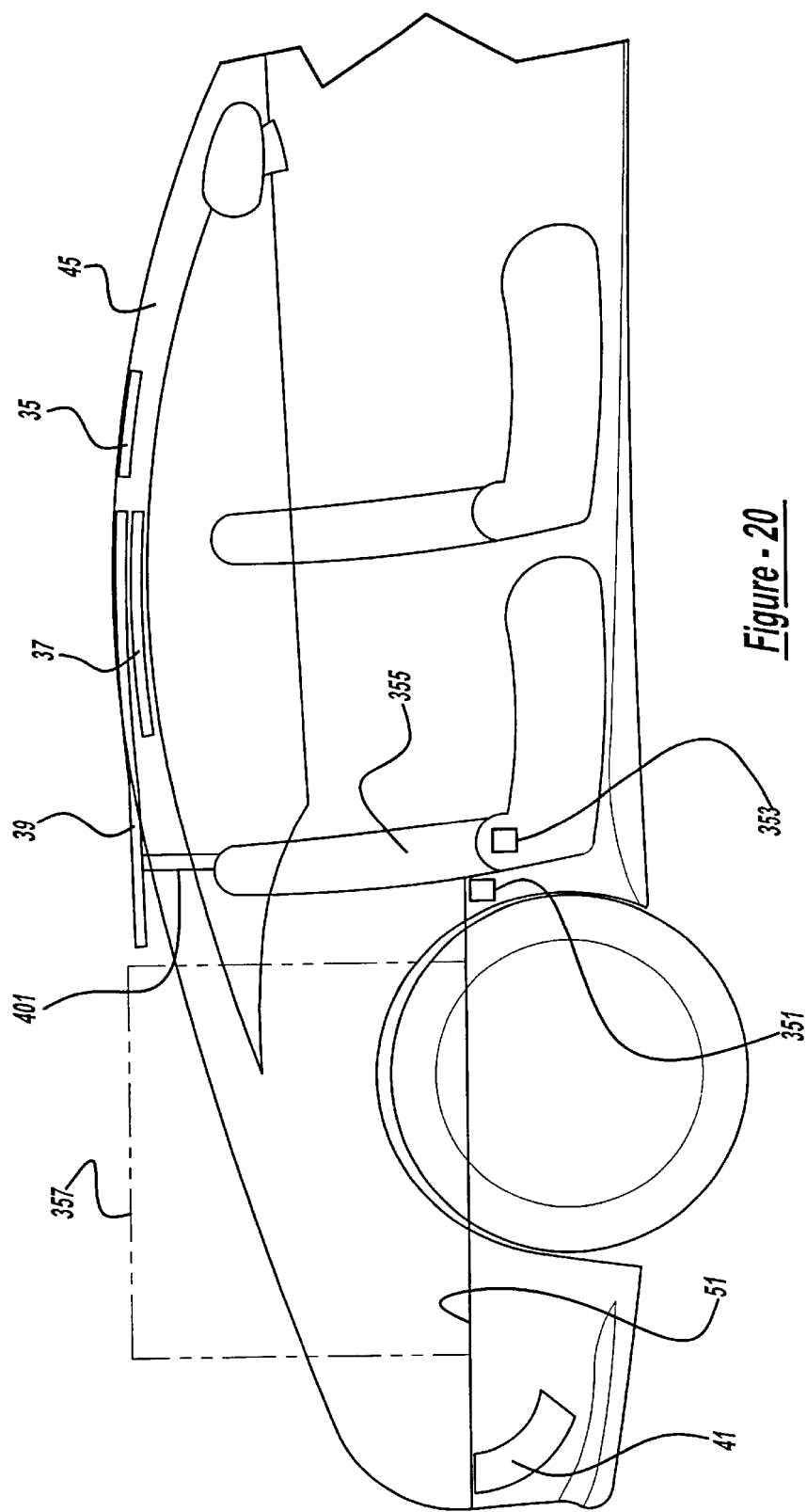
FIG. 20 is a side diagrammatic view of the preferred embodiment system showing the sunroof assemblies in their closed positions, the back window assembly in its open position and a close out panel in its advanced position.
Figure 22:
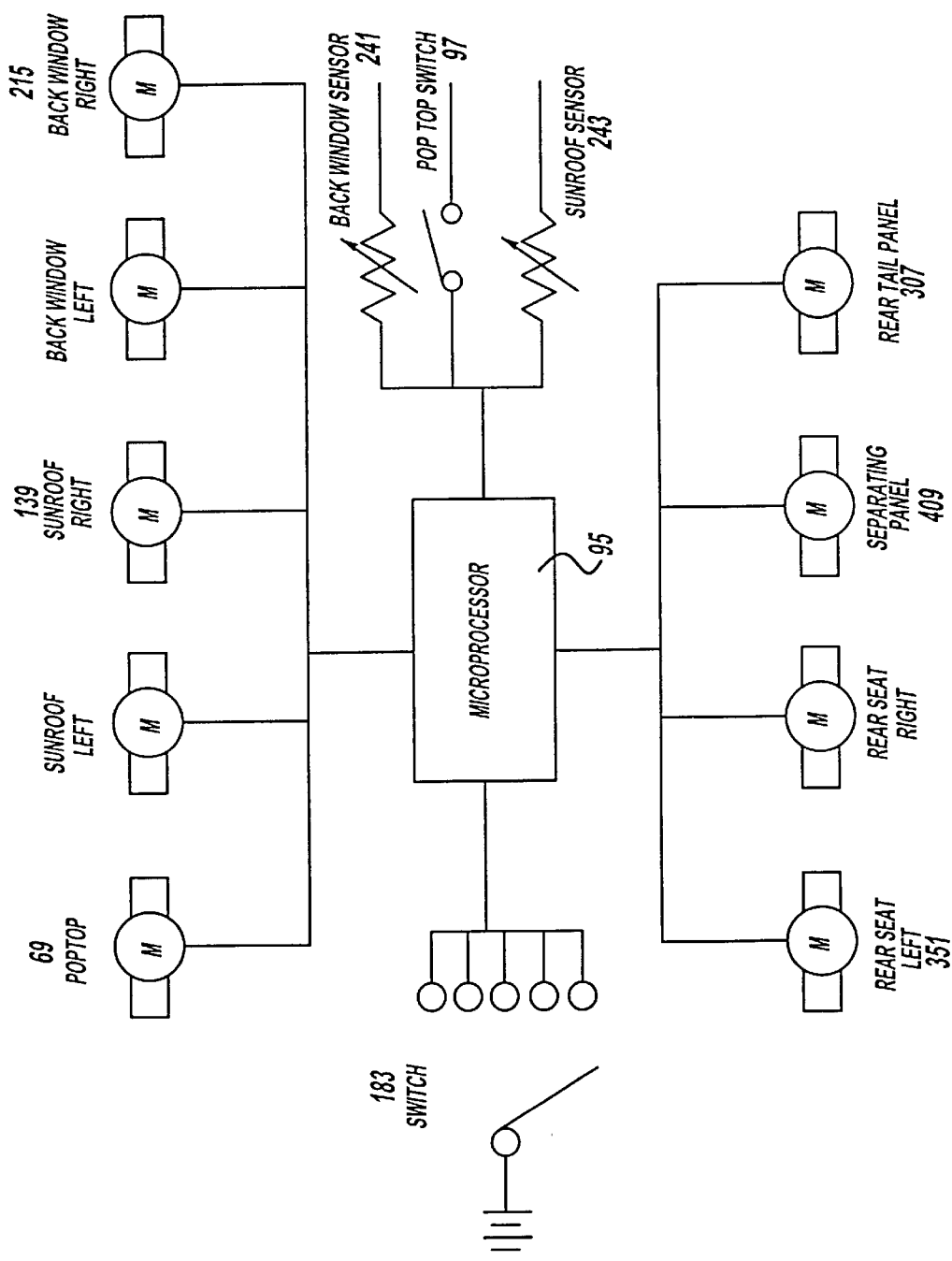
FIG. 22 is an electrical diagram for the preferred embodiment system.

Referring now to FIGS. 4, 20 and 22, electric motors 351 are coupled to a seat movement mechanism 353 which is operable to automatically lower a rear seat back 355 of a rear seat from the raised position shown in FIG. 20 to a horizontal position as shown in FIG. 4. This serves to enhance the storage area for placing cargo 357 within the storage space above floor 51 and optionally, the upper surface of seat back 355 when lowered. Seat back 55 can alternately be manually lowered to increase storage space.

Figure 21:
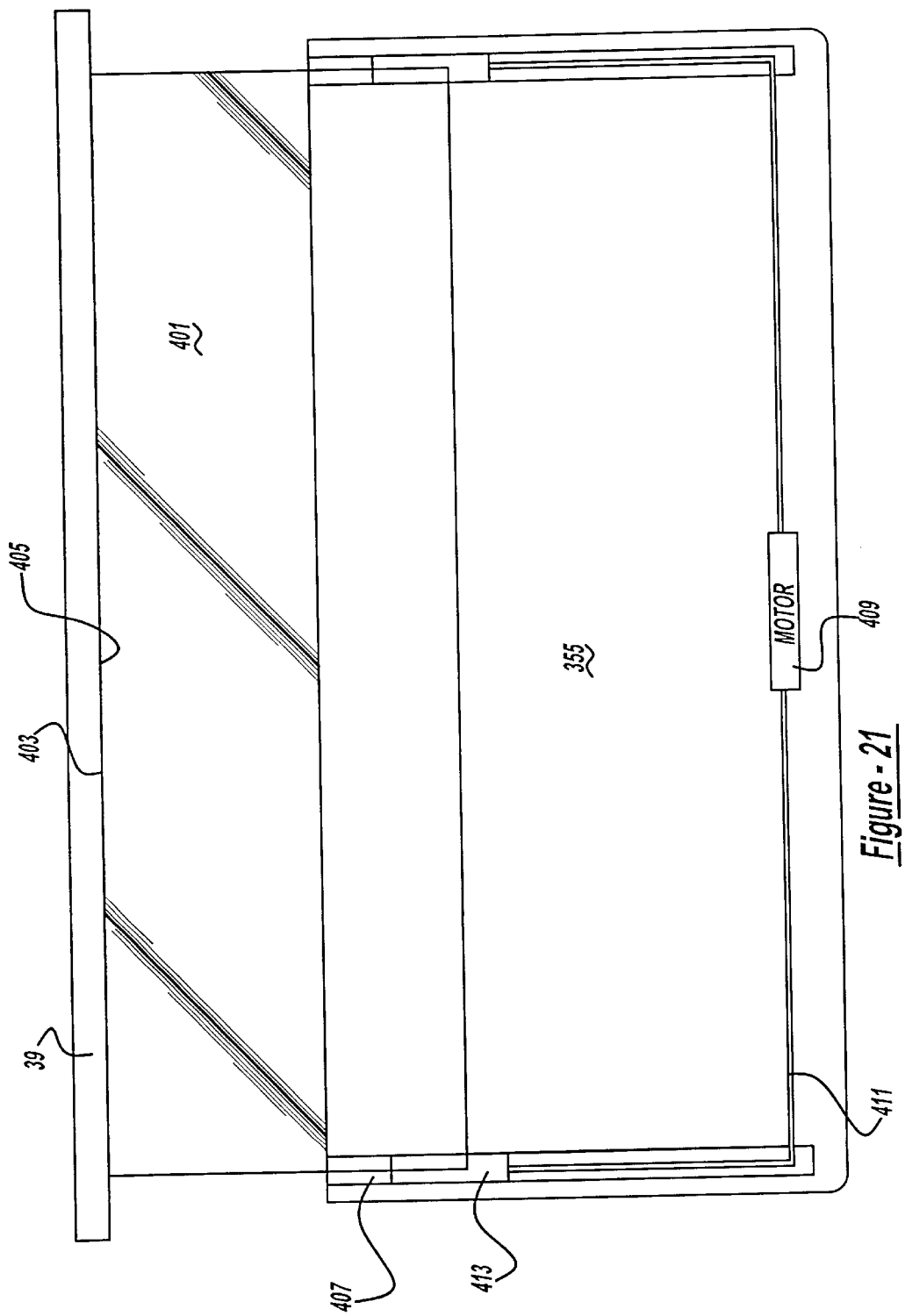
FIG. 21 is a diagrammatic rear view showing a mechanism employed with the close out panel of the preferred embodiment system.

Finally, FIGS. 20 and 21 show a transparent glass or polymeric separating panel 401 which can be vertically advanced to a raised position (as is shown in FIGS. 20 and 21) or retracted to a hidden and stowed position within seat back 355 of the rear seat (as is shown in FIG. 4). Separating panel 401 extends in a generally cross-car and vertical plane, and has an upper edge 403 contoured to match the corresponding bottom surface 405 of back window assembly 39 at a theoretical roof line. A pair of elongated tracks 407 are disposed within outboard portions of seat back 355. An electric motor 409 operably drives a Bowden cable 411 which, in turn, pushes and pulls a shoe 413 slidably attached to track 407. An outboard edge of separating panel 401 is mounted to each shoe 413. Thus, when the rear seat back panel of the rear seat is in the raised and generally vertical position, and the back window assembly is moved to its open position, micro processor 95 will cause electric motor 409 to automatically advance separating panel 401 to contact against the interior of the back window assembly. This serves to separate the passenger compartment from the storage compartment while also reducing vehicle exhaust from entering the passenger compartment during vehicle usage. It should be appreciated that a weather-strip or the like may be disposed between the upper edge of separating panel 401 and the corresponding portion of the back window assembly. It is also envisioned that separating panel 401 can alternately contact against a fixed structural panel of the roof, such as a rear header panel, at the roof line instead of a movable back window member.

While the preferred embodiment of an automotive vehicle open air system has been disclosed herein, it should be appreciated that other variations will still fall within the scope of the present invention. For example, generally rigid rods or pulley-type cables can be employed in place of the preferred Bowden cables. Gears of the motor may directly contact a rack-like track, or a jack screw, tape drive or hydraulic mechanism can also be provided for any of the moving components. Additionally, the number and arrangement of linkages, cams, brackets, switches and electric motors can be varied as long as the functions of the present invention are achieved. Furthermore, the front pop-top sunroof, second sunroof, back window assembly, tail panel assembly and separating panel assembly can all be employed independently of each other or in various combinations. While various materials have been disclosed, it should be appreciated that other materials can be readily used. It is intended by the following claims to cover these and any other departures from the disclosed embodiments which fall within the true spirit of this invention.

The invention claimed is:

1. An automotive vehicle comprising:
   a passenger compartment having a front seat and a rear seat, the rear seat having a movable seat back;
   a storage compartment located rearward of the passenger compartment, the storage compartment being accessible from both the passenger compartment and externally from the rear of the storage compartment;
   a substantially transparent panel movable from a retracted position, allowing open access from the passenger compartment to the storage compartment, to a raised position, substantially separating the passenger compartment from the storage compartment;
   the seat back of the rear seat being foldable to allow supplemental storage above the rear seat when the panel is retracted; and
   an automatically movable back window assembly, the panel being movable to its raised position when the back window assembly is opened wherein an upper edge of the panel substantially seals against the back window assembly.

2. The system of claim 1 further comprising an automatically powered driving mechanism operably moving the back window assembly.

3. The system of claim 2 wherein the mechanism includes an electric motor and a flexible cable.

4. The system of claim 2 further comprising an electrical control system connected to the mechanism automatically moving the panel in response to desired movement of the back window assembly.

5. The system of claim 1 further comprising a movable sunroof panel located adjacent to and forward of the back window assembly when the back window assembly is in its closed position.

6. The system of claim 5 wherein the back window assembly is substantially parallel and overlapping with the sunroof panel when the back window assembly is in its open position.

7. The system of claim 1 wherein the back window assembly at least partially serves to cover the storage compartment.

8. The system of claim 1 further comprising a second sunroof panel located forward of a first sunroof panel.

9. The system of claim 1 further comprising a lifting mechanism operably lowering the panel at least partially into one of the seats.

10. The system of claim 5 wherein at least a majority of the sunroof panel is transparent.

11. The system of claim 1 wherein the open position of the back window assembly is higher than the closed position of the back window assembly.

12. The system of claim 1 wherein the back window assembly is oriented on a substantially cross-car and vertical plane.

13. The system of claim 8 further comprising:
   a tilting mechanism coupled to the second sunroof panel; and
   an actuator operably driving the tilting mechanism to move the second sunroof panel between a closed position and a tilted venting position.

14. An automotive vehicle comprising:
   a passenger compartment having a front seat and a rear seat, the rear seat having a movable seat back;
   a storage compartment located rearward of the passenger compartment, the storage compartment being accessible from both the passenger compartment and externally from the rear of the storage compartment;
   an automatically movable covering system operably covering the passenger and storage compartments when in at least one operating configuration;
   a substantially transparent panel movable from a retracted position, allowing open access from the passenger compartment to the storage compartment, to a raised position, substantially separating the passenger compartment from the storage compartment;
   the seat back of the rear seat being foldable to allow supplemental storage above the rear seat when the panel is retracted;
   the seat back of the rear seat being positioned in a passenger useable condition when the panel is in its raised position; and
   an automatically movable back window assembly, the upper edge of the panel operably sealing against the back window assembly when the back window assembly is opened and the panel is moved to its raised position.

15. The vehicle of claim 14 wherein a majority of the storage compartment is upwardly open in one configuration to allow clear vertical access.

16. The vehicle of claim 15 wherein the storage compartment is externally enclosed when in a second configuration, and the vehicle is a sedan.

17. The vehicle of claim 15 wherein the panel is automatically raised when the storage compartment is openly accessible from outside the vehicle.

18. The vehicle of claim 14 wherein the panel extends in a substantially cross-vehicle and vertical plane.

19. The vehicle of claim 14 further comprising an automatic actuator operably moving the back of the rear seat.

20. The vehicle of claim 14 further compromising an electric motor and a track operably controlling movement of the panel.

21. The vehicle of claim 14 further comprising:
   a first sunroof;
   a first automatic actuation mechanism operably opening the first sunroof;
   a second sunroof;
   a second automatic actuation mechanism operably opening the second sunroof; and
   a third automatic actuation mechanism operably opening the back window assembly.

* * * * *